(12) United States Patent
Mukaigawa et al.

(10) Patent No.: US 12,409,799 B2
(45) Date of Patent: Sep. 9, 2025

(54) VEHICLE HAVING AN ENERGY ABSORPTION MEMBER

(71) Applicant: TOYOTA JIDOSHA KABUSHIKI KAISHA, Toyota (JP)

(72) Inventors: Yuuki Mukaigawa, Seto (JP); Kyohei Miyaoka, Ikeda (JP); Shunji Shibata, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 18/126,669

(22) Filed: Mar. 27, 2023

(65) Prior Publication Data

US 2023/0311794 A1 Oct. 5, 2023

(30) Foreign Application Priority Data

Mar. 29, 2022 (JP) ................. 2022-053201

(51) Int. Cl.
*B60K 1/04* (2019.01)
*B60R 16/04* (2006.01)
*B62D 21/15* (2006.01)
*B62D 25/20* (2006.01)

(52) U.S. Cl.
CPC ............. *B60R 16/04* (2013.01); *B60K 1/04* (2013.01); *B62D 21/155* (2013.01); *B62D 25/20* (2013.01); *B60K 2001/0438* (2013.01)

(58) Field of Classification Search
CPC .. B60K 1/04; B60K 2001/0438; B60R 16/04; B60L 50/66; B60L 50/64; H01M 50/204
See application file for complete search history.

(56) References Cited

U.S. PATENT DOCUMENTS

| 11,752,854 B2* | 9/2023 | Ozawa ................ H01M 50/204 180/68.5 |
| 2015/0176673 A1 | 6/2015 | Kaneko et al. |
| 2016/0083017 A1 | 3/2016 | Sakaguchi et al. |
| 2021/0221435 A1 | 7/2021 | Takahashi et al. |

FOREIGN PATENT DOCUMENTS

| JP | 2013-256265 A | 12/2013 |
| JP | 2014-031109 A | 2/2014 |
| JP | 2014-227075 A | 12/2014 |
| JP | 2017-226353 A | 12/2017 |
| JP | 2021-088264 A | 6/2021 |
| JP | 2021-112973 A | 8/2021 |

* cited by examiner

*Primary Examiner* — Jason D Shanske
*Assistant Examiner* — James J Triggs
(74) *Attorney, Agent, or Firm* — Dinsmore & Shohl LLP

(57) ABSTRACT

A vehicle may include a vehicle body including a floor panel, a battery pack located below the floor panel, and an energy absorption member located outwardly from the battery pack in a vehicle width direction and fixing the battery pack to the vehicle body. The energy absorption member may be a hollow member extending along a vehicle longitudinal direction and having a constant cross section along the vehicle longitudinal direction. An inner sidewall of the energy absorption member that faces the battery pack may incline downwardly in a vehicle height direction as it extends inwardly in the vehicle width direction.

8 Claims, 6 Drawing Sheets

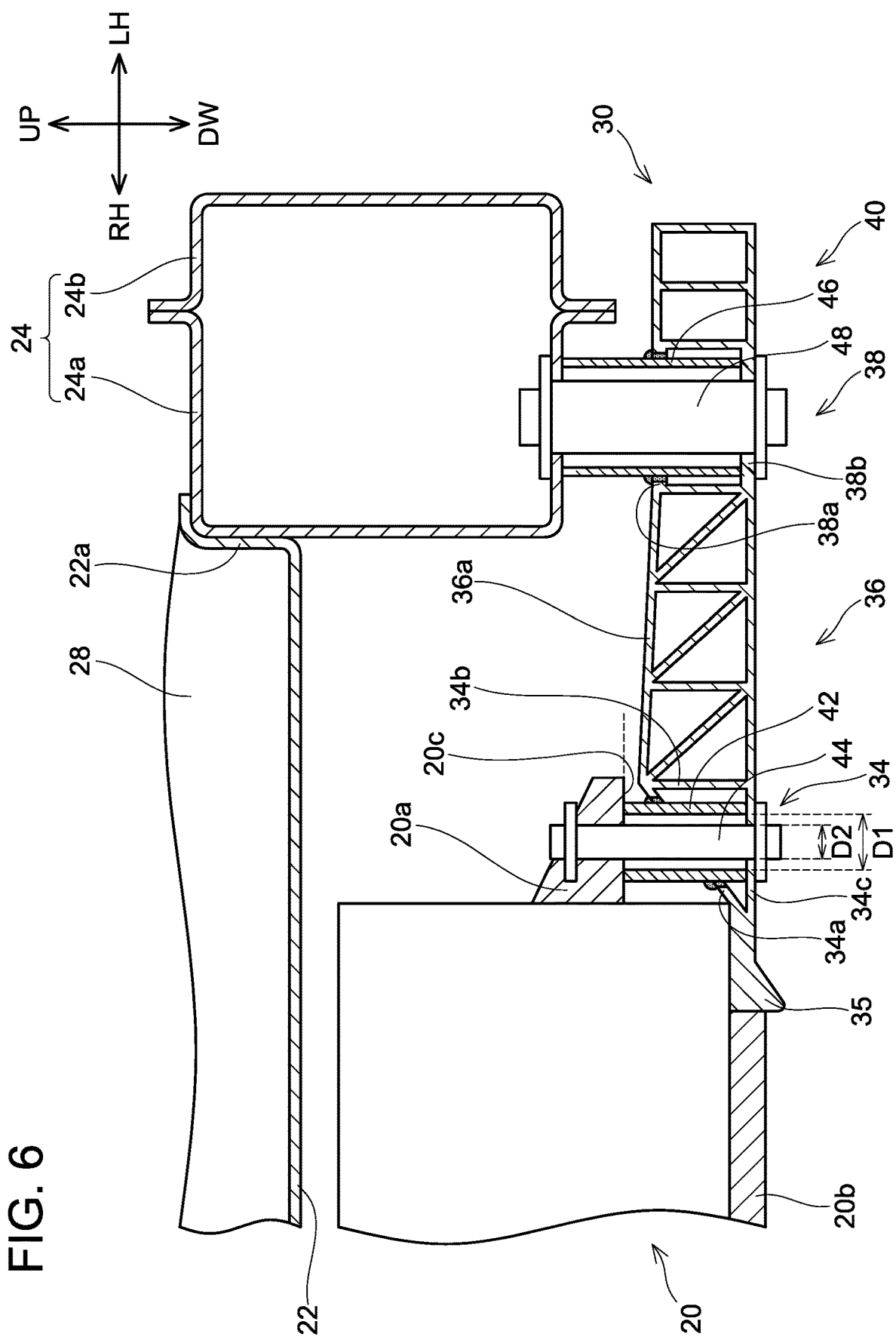

VEHICLE HAVING AN ENERGY ABSORPTION MEMBER

CROSS-REFERENCE TO RELATED APPLICATION(S)

This application claims priority to Japanese patent application No. 2022-053201, filed on Mar. 29, 2022, the entire contents of which are incorporated herein by reference.

TECHNICAL FIELD

The technique disclosed herein relates to a vehicle.

BACKGROUND

Japanese Patent Application Publication No. 2017-226353 describes a vehicle. This vehicle includes a pair of rockers, a floor panel extending between the pair of rockers, a battery pack located below the floor panel, and an energy absorption member located outwardly from the battery pack in a vehicle width direction and fixed to one of the pair of rockers.

SUMMARY

With the above structure, when side collision occurs to the vehicle, the energy absorption member (which hereafter may be referred to as an EA member) deforms, by which collision energy is absorbed. At this time, if an inner sidewall of the EA member facing the battery pack is pressed against a sidewall of the battery pack, there is a risk that relatively large collision load may be applied on the sidewall of the battery pack.

In light of the above situation, the present disclosure provides a technique which may reduce collision load transmitted from an EA member to a sidewall of a battery pack.

The technique disclosed herein is implemented as a vehicle. This vehicle may comprise: a vehicle body comprising a floor panel; a battery pack located below the floor panel; and an energy absorption member located outwardly from the battery pack in a vehicle width direction and fixing the battery pack to the vehicle body. The energy absorption member may be a hollow member extending along a vehicle longitudinal direction and having a constant cross section along the vehicle longitudinal direction and comprises an inner sidewall that faces the battery pack. The inner sidewall of the energy absorption member may incline downwardly in a vehicle height direction as it extends inwardly in the vehicle width direction.

With the above structure, when side collision occurs to the vehicle, the EA member deforms, by which collision energy is absorbed. Here, the inner sidewall of the EA member facing the battery pack inclines downwardly in the vehicle height direction as it extends inwardly in the vehicle width direction. Thus, even when the EA member is compressed and deformed in the vehicle width direction toward the battery pack, it is possible to avoid or suppress the EA member coming into contact with the sidewall of the battery pack. Consequently, collision load applied on the sidewall of the battery pack from the EA member can be reduced.

BRIEF DESCRIPTION OF DRAWINGS

FIG. 6 is a cross-sectional view illustrating a structure of a vehicle 10 of Embodiment 2 at a position corresponding to the line in FIG. 2.

DETAILED DESCRIPTION

Figure 1:
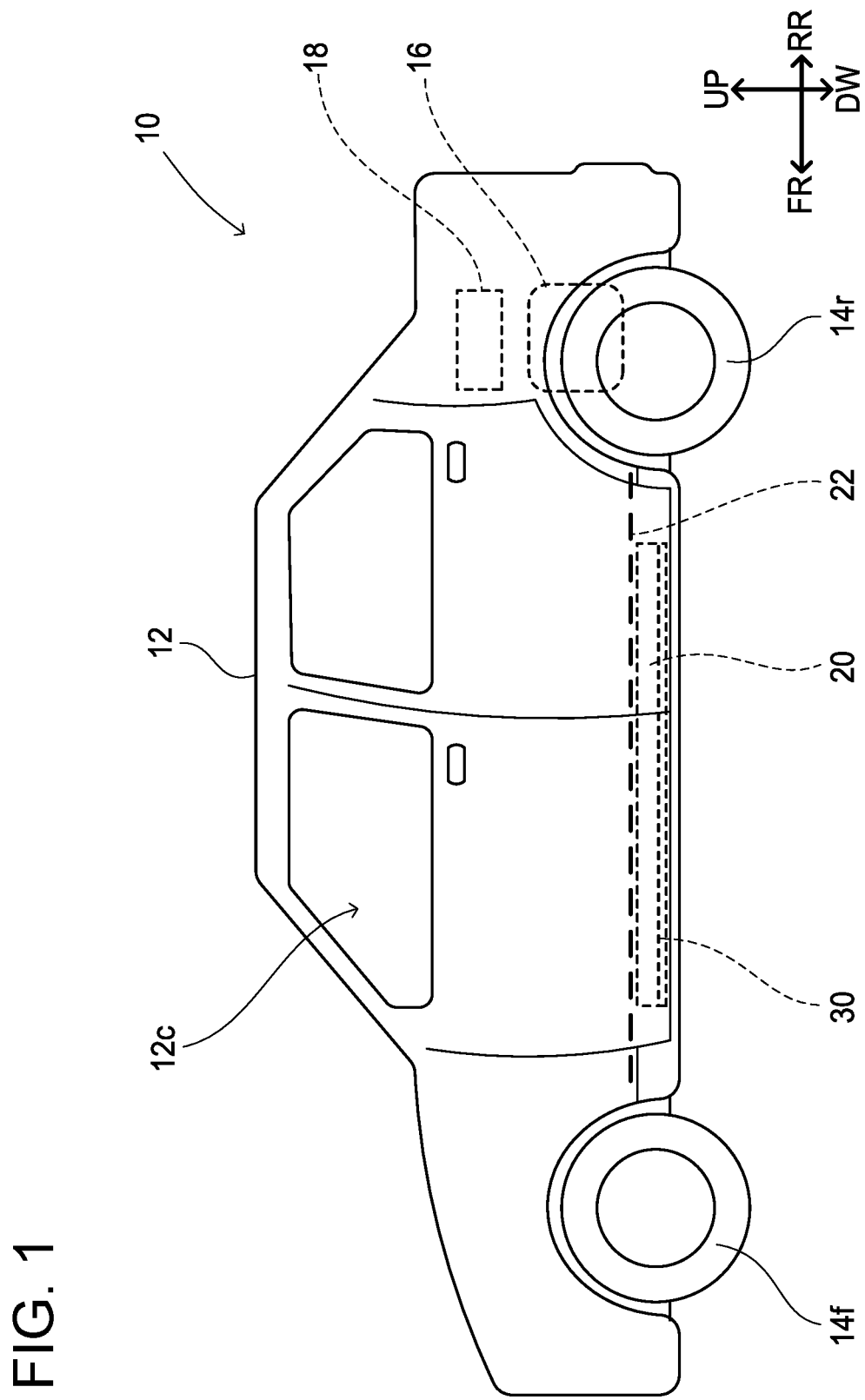
FIG. 1 schematically illustrates a configuration of a vehicle 10 of Embodiment 1.

In an embodiment of the technique disclosed herein, the vehicle may further comprise a collar extending in the vehicle height direction and comprising an upper end being in contact with the battery pack and a lower end being in contact with the energy absorption member; and a bolt extending through the collar and fastening the energy absorption member to the battery pack. According to such a configuration, a distance between the battery pack and the EA member fastened by the bolt is determined by a dimension of the collar in the vehicle height direction. Thus, variations in the above distance due to a fastening operation can be avoided or suppressed.

In the aforementioned embodiment, the inner sidewall of the energy absorption member may comprise an opening through which the collar extends. According to such a configuration, the collar can be disposed relative to the energy absorbing member regardless of an angle at which the sidewall inclines.

In some of the aforementioned embodiments, the collar may be welded to the inner sidewall of the energy absorption member. According to such a configuration, the collar can tightly be fixed to the EA member. Thus, even when the EA member is compressed and deformed in the vehicle width direction toward the battery pack, it is possible to avoid or suppress both the EA member and the collar coming into contact with the sidewall of the battery pack.

In some of the aforementioned embodiments, an inner diameter of the collar is at least twice a nominal diameter of the bolt. According to such a configuration, a relatively large space can be secured between the collar and the bolt. Thus, when the EA member is compressed and deformed in the vehicle width direction toward the battery pack, the space between the collar and the bolt can reduce collision load applied from the EA member on the sidewall of the battery pack.

In some of the aforementioned embodiments, the battery pack may comprise a bracket that protrudes outwardly in the vehicle width direction. In this case, the bolt may fasten the energy absorption member to the bracket of the battery pack. According to such a configuration, a distance between the battery pack and the EA member can be increased in the vehicle width direction by an amount by which the bracket protrudes outwardly in the vehicle width direction.

Thus, when the EA member is compressed and deformed in the vehicle width direction toward the battery pack, it is possible to reduce the collision load applied from the EA member on the sidewall of the battery pack. In another embodiment, however, the EA member may directly be fastened to the battery pack by the bolt without disposing the bracket on the battery pack.

In an embodiment of the technique disclosed herein, the energy absorption member may comprise an inner end portion in which the inner sidewall is included and a middle portion adjacent to the inner end portion in the vehicle width direction. In this case, a thickness of the inner sidewall of the energy absorption member may be greater than a thickness of any one of walls constituting the middle portion of the energy absorption member. According to such a configuration, it is possible to make rigidity of the inner sidewall of the EA member facing the battery pack greater than rigidity of any one of the walls constituting the middle portion of the EA member. Thus, when the EA member is compressed and deformed in the vehicle width direction toward the battery pack, it is possible to make the inner sidewall of the EA member less susceptible to deformation as compared to any one of the walls constituting the middle portion of the EA member. Consequently, it is possible to avoid or suppress the EA member coming into contact with the side wall of the battery pack.

In the aforementioned embodiment, a thickness of any one of walls constituting the inner end portion may be greater than the thickness of any one of the walls constituting the middle portion of the energy absorption member. According to such a configuration, it is possible to make rigidity of any one of the walls constituting the inner end portion including the inner sidewall facing the battery pack greater than the rigidity of any one of the walls constituting the middle portion. Thus, when the EA member is compressed and deformed in the vehicle width direction toward the battery pack, it is possible to make the inner end portion of the EA member less susceptible to deformation as compared to the middle portion.

In an embodiment of the technique disclosed herein, the battery pack may comprise a bracket that protrudes outwardly in the vehicle width direction. The energy absorption member may comprise an inner end portion in which the inner sidewall is included and a middle portion adjacent to the inner end portion in the vehicle width direction. The inner end portion of the energy absorption member may be fixed to a lower surface of the bracket of the battery pack from below. In this case, an upper wall of the middle portion of the energy absorption member may be located lower than the lower surface of the bracket in the vehicle height direction. According to such a configuration, when the EA member is compressed and deformed in the vehicle width direction toward the battery pack, it is possible to avoid or suppress the EA member coming into contact with the bracket of the battery pack. Consequently, the collision load applied on the battery pack from the EA member can be reduced.

Simple recitations such as "forward", "rearward", "a longitudinal direction" herein respectively refer to forward, rearward and a longitudinal direction with respect to a vehicle. Similarly, simple recitations such as "leftward", "rightward" and "a vehicle width direction" respectively refer to leftward, rightward and a vehicle width direction with respect to the vehicle and simple recitations such as "upward", "downward" and "a height direction" refer to upward, downward and a height direction with respect to the vehicle. The vehicle width direction of the vehicle is also a left-right direction of the vehicle, and it may be referred to as "left-right direction" herein. For example, when the vehicle is placed on a horizontal surface, the height direction of the vehicle coincides with the vertical direction. The vehicle width direction of the vehicle is a direction parallel to the horizontal surface and parallel to an axle of the vehicle, and the longitudinal direction of the vehicle is a direction parallel to the horizontal surface and perpendicular to the axle of the vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(Embodiment 1) With reference to drawings, a vehicle 10 of Embodiment 1 will be described. The vehicle 10 of the present embodiment is classified as an electric vehicle including a motor 16 driving wheels 14*f*, 14*r*, and is typically an electric vehicle which travels on roads (a so-called automobile). However, a part of or all the technique described in the present embodiment can similarly be applied to an electric vehicle which travels on tracks. The vehicle is not limited to a vehicle operated and driven by a user, but may be a vehicle remotely operated by external device(s) or a vehicle which travels autonomously.

Here, a direction FR in the drawings indicates a front side in a longitudinal direction (or a front-rear direction) of the vehicle 10, and a direction RR indicates a rear side in the longitudinal direction of the vehicle 10. A direction LH indicates a left side in a vehicle width direction (or a left-right direction) of the vehicle 10 and a direction RH indicates a right side in the vehicle width direction of the vehicle 10. A direction UP indicates an upside in a height direction (or an up-down direction) of the vehicle 10, and a direction DW indicates a downside in the height direction of the vehicle 10.

As illustrated in FIG. 1, the vehicle 10 includes a vehicle body 12 and the plurality of wheels 14*f*, 14*r*. The vehicle body 12 includes a cabin 12*c* which is a space to accommodate occupants. The plurality of wheels 14*f*, 14*r* is rotatably attached to the vehicle body 12. The plurality of wheels 14*f*, 14*r* includes a pair of front wheels 14*f* positioned at a front portion of the vehicle body 12 and a pair of rear wheels 14r positioned at a rear portion of the vehicle body 12. The pair of front wheels 14f is disposed coaxially to each other, and the pair of rear wheels 14r is also disposed coaxially to each other. The number of wheels 14f, 14r is not limited to four. The vehicle body 12 is constituted of, but not particularly limited to, metal, such as steel or aluminum alloy.

Figure 2:
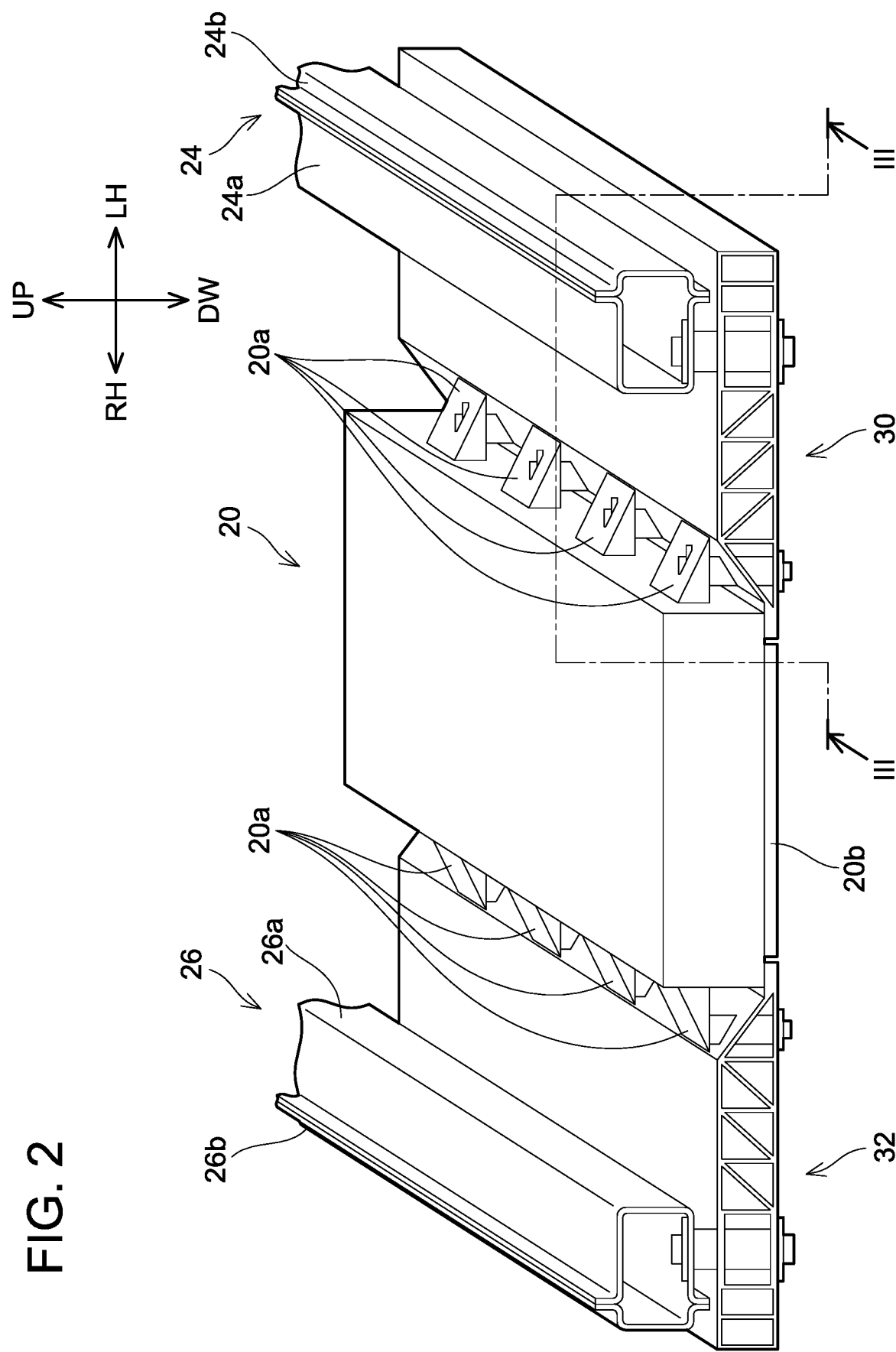
FIG. 2 is a view explaining positional relationships between a battery pack 20, a pair of EA members 30, 32 and a pair of rockers 24, 26.
Figure 3:
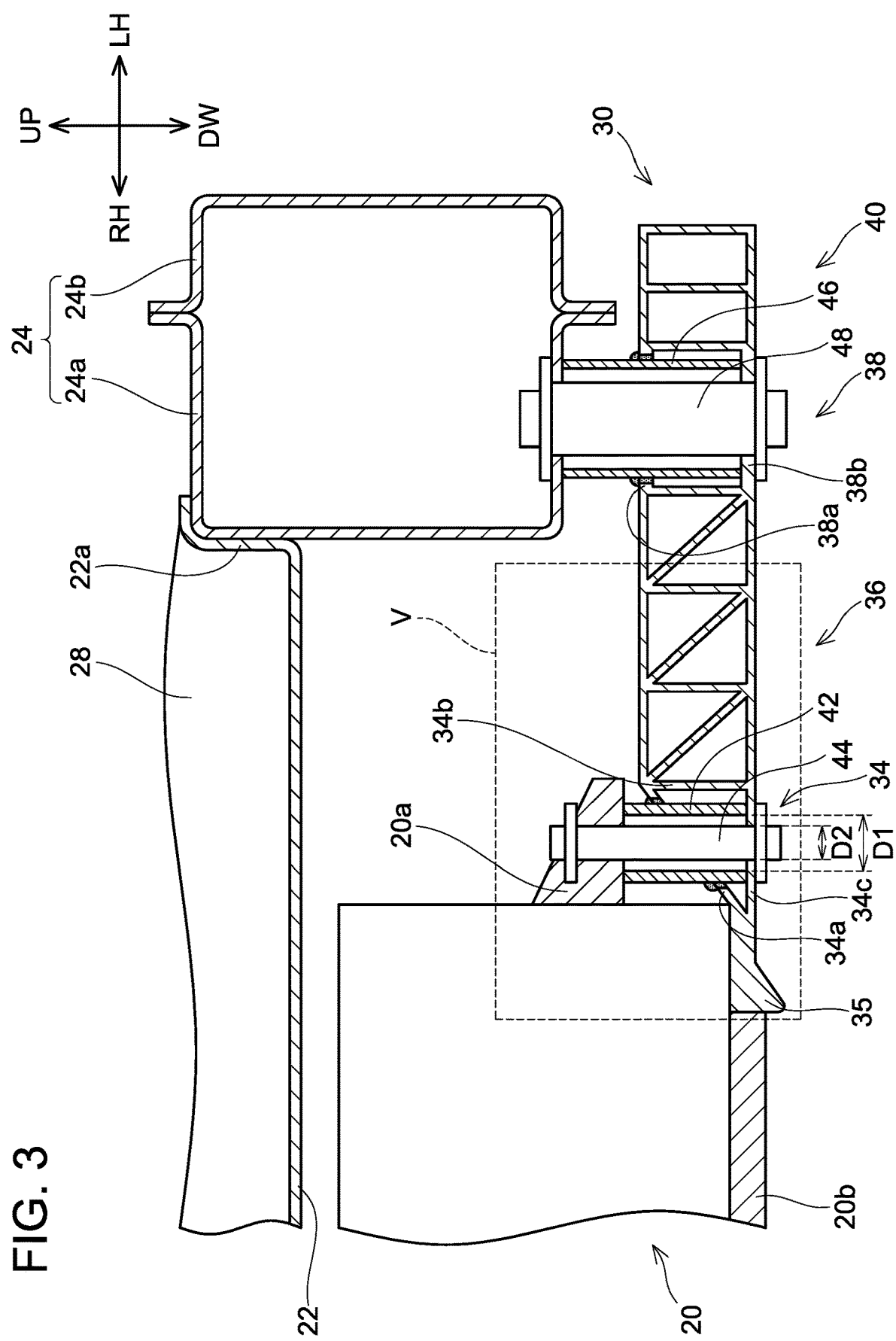
FIG. 3 is a cross-sectional view along a line of FIG. 2.

As illustrated in FIG. 1, the vehicle 10 further includes a motor 16, an electric control unit 18 and a battery pack 20. The motor 16 is a traction motor that drives the pair of rear wheels 14r and is connected to the pair of rear wheels 14r. The battery pack 20 is an electric device configured to supply power to the motor 16 and is electrically connected to the motor 16 via the electric control unit 18. The battery pack 20 houses a plurality of secondary battery cells and is configured rechargeable with external power or regenerative power of the motor 16. The battery pack 20 is located below a floor panel 22 and is disposed along the floor panel 22. Although this is merely an example, as illustrated in FIGS. 2 and 3, the battery pack 20 of the present embodiment includes brackets 20a protruding outwardly in the vehicle width direction. Moreover, although not particularly limited to this configuration, a support 20b protruding downwardly is disposed on a lower wall of the battery pack 20. The electric control unit 18 houses a DC-DC converter and/or inverter and is configured to control driving power supplied from the battery pack 20 to the motor 16 and regenerative power supplied from the motor 16 to the battery pack 20 depending on, for example, driving operations by the user.

Wheel(s) to be driven by the motor 16 are not limited to the pair of rear wheels 14r, and the motor 16 simply needs to be configured to drive at least one of the plurality of wheels 14f, 14r. The vehicle 10 may further include another prime mover such as an engine instead of or as an alternative to the motor 16. The vehicle 10 may include another power device such as fuel cell unit(s) or solar panel(s) instead of or as an alternative to the battery pack 20. The vehicle 10 is not limited to an electric automobile described herein but may be a hybrid vehicle, fuel-cell vehicle, a solar car, or the like.

As illustrated in FIGS. 2 and 3, the vehicle body 12 includes the floor panel 22, a pair of rockers 24, 26 and a floor crossbeam 28. The floor panel 22 is a plate-like member constituting a bottom surface of the cabin 12c. Each of the rockers 24, 26 is a hollow member having a constant cross-section along the vehicle longitudinal direction, and constitutes a frame of the vehicle body 12. The pair of rockers 24, 26 includes a left rocker 24 and a right rocker 26. The left rocker 24 is positioned at a left edge 22a of the floor panel 22 and extends in the front-rear direction on the outer side of the floor panel 22 in the vehicle width direction. The pair of rockers 24 is arranged symmetrically to each other with respect to the vehicle width direction. Thus, the right rocker 26 is positioned at a right edge of the floor panel 22 and extends in the front-rear direction on the outer side of the floor panel 22 in the vehicle width direction.

Although not particularly limited to this configuration, the left rocker 24 includes a left rocker inner panel 24a positioned on the inner side in the width direction and a left rocker outer panel 24b positioned on the outer side in the width direction. The left rocker inner panel 24a and the left rocker outer panel 24b are joined to each other at the respective top and bottom edges, and a closed space extending in the front-rear direction is defined inside the left rocker 24. Although not particularly limited to this configuration as well, the right rocker 26 includes a right rocker inner panel 26a positioned on the inner side in the width direction and a right rocker outer panel 26b positioned on the outer side in the width direction. The right rocker inner panel 26a and the right rocker outer panel 26b are joined to each other at the respective top and bottom edges, and a closed space extending in the front-rear direction is defined inside the right rocker 26. The floor panel 22 extends between the pair of rockers 24, 26 and is joined to the left rocker inner panel 24a at its left edge 22a and joined to the right rocker inner panel 26a at its right edge. The rockers 24, 26 may be constituted of three or more panels, not limited only to the rocker inner panels 24a, 26a and the rocker outer panels 24b, 26b.

The floor crossbeam 28 is a hollow member having a constant cross section along the vehicle longitudinal direction and constitutes a part of the flame of the vehicle body 12. The floor crossbeam 28 is positioned on the floor panel 22 and extends between the pair of rockers 24, 26 in the vehicle width direction. Although the illustration is omitted, a plurality of floor crossbeams 28 is disposed between the pair of rockers 24, 26.

As illustrated in FIGS. 2, 3, the vehicle 10 further includes a pair of energy absorption members 30, 32 (hereafter referred to as EA members 30, 32). Each of the pair of EA members 30, 32 is a hollow member extending along the vehicle longitudinal direction and having a constant cross section along the vehicle longitudinal direction. The pair of EA members 30, 32 includes a left EA member 30 and a right EA member 32. The pair of EA members 30, 32 is arranged symmetrically to each other with respect to the vehicle width direction. The left EA member 30 is located at a left portion of the vehicle 10 and outwardly from the battery pack 20 in the vehicle width direction. The right EA member 32 is located at a right portion of the vehicle 10 and outwardly from the battery pack 20 in the vehicle width direction. At least one of the EA members 30, 32 is compressed and deformed when side collision occurs to the vehicle 10, by which it absorbs collision energy. The pair of EA members 30, 32 is constituted of metal such as aluminum. However, a material constituting the pair of EA members 30, 32 is not particularly limited.

As described above, the pair of EA members 30, 32 is arranged symmetrically to each other with respect to the vehicle width direction. Structures of the left EA member 30 and its relevant members (e.g., the battery pack 20 and the left rocker 24) are symmetrical to structures of the right EA member 32 and its relevant members (e.g., the battery pack 20 and the right rocker 26) with respect to the vehicle width direction. Thus, with reference to FIG. 3, the structures of the left EA member 30 and its relevant members (e.g., the battery pack 20 and the left rocker 24) will hereafter be described. Hereafter, the left EA member 30 will simply be referred to as the EA member 30.

As illustrated in FIG. 3, the EA member 30 includes an inner end portion 34, a first middle portion 36, a second middle portion 38 and an outer end portion 40. The inner end portion 34 is at the innermost position in the vehicle width direction and faces the battery pack 20. The outer end portion 40 is at the outermost position in the vehicle width direction. The first middle portion 36 and the second middle portion 38 are positioned between the inner end portion 34 and the outer end portion 40 in the vehicle width direction. The first middle portion 36 is adjacent to the inner end portion 34 and the second middle portion 38 is adjacent to the outer end portion 40. In other words, the inner end portion 34, the first middle portion 36, the second middle portion 38 and the outer end portion 40 are arranged in this order from inside to outside in the vehicle width direction.

The inner end portion 34 includes an inner sidewall 34a, a vertical wall 34b, and a lower wall 34c. The inner sidewall 34a faces the battery pack 20 and inclines downwardly in the vehicle height direction as it extends inwardly in the vehicle width direction. The vertical wall 34b extends along the vehicle height direction and the lower wall 34c extends along the vehicle width direction. Thus, a space having a constant cross-section in the vehicle longitudinal direction is defined by the inner sidewall 34a, the vertical wall 34b and the lower wall 34c.

Although not particularly limited to this configuration, the EA member 30 further includes a protrusion 35. The protrusion 35 is connected to the lower wall 34c and the inner sidewall 34a of the inner end portion 34 and extends toward the battery pack 20.

As illustrated in FIG. 3, the vehicle 10 further includes first collars 42 and first bolts 44. The inner sidewall 34a included in the inner end portion 34 of the EA member 30 comprises openings through which the first collars 42 extend. The first collars 42 are disposed such that the first collars 42 extend though the openings in the inner sidewall 34a in the vehicle height direction. Although this is an example, the first collars 42 are welded to the inner sidewall 34a of the EA member 30. The upper end of each first collar 42 is in contact with corresponding one of the brackets 20a of the battery pack 20 and the lower end of each first collar 42 is in contact with the lower wall 34c of the inner end portion 34. The first bolts 44 extend though the first collars 42 and fasten the EA member 30 to the brackets 20a of the battery pack 20. Thus, the EA member is fixed to the brackets 20a of the battery pack 20 at the inner end portion 34. An inner diameter D1 of the first collars 42 is greater than a nominal diameter D2 of the first bolts 44. For example, the inner diameter D1 of the first collars 42 is at least twice the nominal diameter D2 of the first bolts 44. As another embodiment, the brackets 20a may not be disposed on the battery pack 20, and the EA member 30 may directly be fastened to the battery pack 20 by the first bolts 44.

As illustrated in FIG. 3, the vehicle 10 further includes second collars 46 and second bolts 48. Although not particularly limited to this configuration, an upper wall 38a of the second middle portion 38 of the EA member 30 also includes openings through which the second collars 46 extend. The second collars 46 are disposed such that the second collars 46 extend though the openings in the upper wall 38a of the second middle portion 38 in the vehicle height direction. Although this is an example, the second collars 46 are welded to the upper wall 38a of the second middle portion 38. The upper ends of the second collars 46 are in contact with the left rocker inner panel 24a of the left rocker 24 and the lower ends of the second collars 46 are in contact with the lower wall 38b of the second middle portion 38. The second bolts 48 extend through the second collars 46 and fasten the EA member 30 to the left rocker 24. Thus, the EA member 30 is fixed to the left rocker 24 of the vehicle body 12 at the second middle portion 38. As described above, the EA member 30 is fixed to the brackets 20a of the battery pack 20 at the inner end portion 34, thus the EA member 30 fixes the battery pack 20 to the vehicle body 12. Although not particularly limited to this configuration, the inner diameter of the second collars 46 is greater than the nominal diameter of the second bolts 48.

Figure 4:
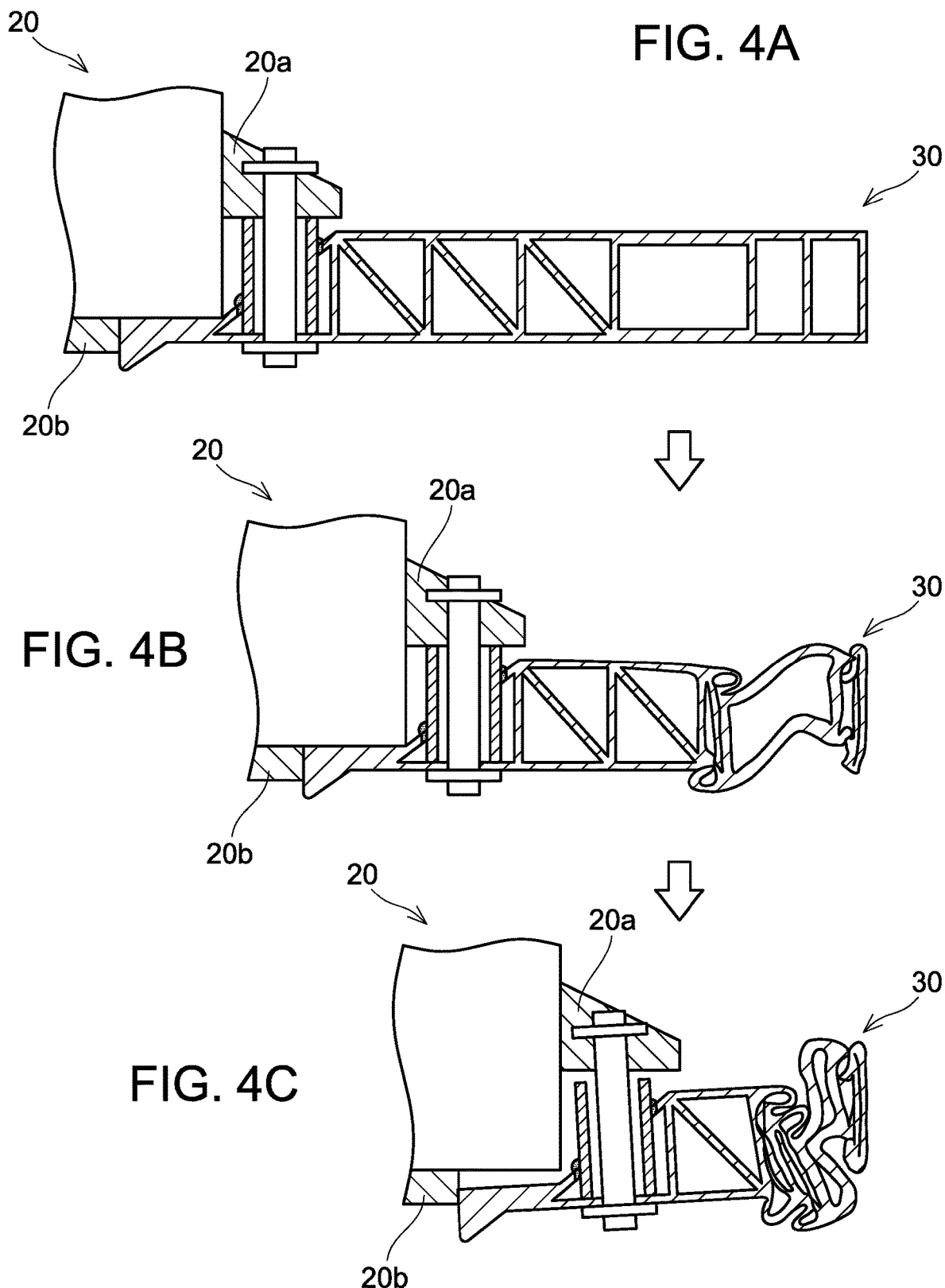
FIG. 4A illustrates an example of deformation of the EA member 30 over time when side collision occurs to the vehicle 10.
FIG. 4B illustrates the example of deformation of the EA member 30 over another time when side collision occurs to the vehicle 10.
FIG. 4C illustrates the example of deformation of the EA member 30 over another time when side collision occurs to the vehicle 10.

When side collision occurs to the vehicle 10, in the structure described above, one of the EA members 30, 32 deforms as illustrated in FIGS. 4A to 4C by which collision energy is absorbed. Here, the inner sidewall 34a of each of the EA members 30, 32 facing the battery pack 20 inclines downwardly in the vehicle height direction as it extends inwardly in the vehicle width direction. Thus, even when one of the EA members 30, 32 is compressed and deformed in the vehicle width direction toward the battery pack 20, it is possible to avoid or suppress the one of the EA members 30, 32 coming into contact with the corresponding sidewall of the battery pack 20. Consequently, collision load applied on the sidewall of the battery pack 20 from the one of the EA members 30, 32 can be reduced.

Figure 5:
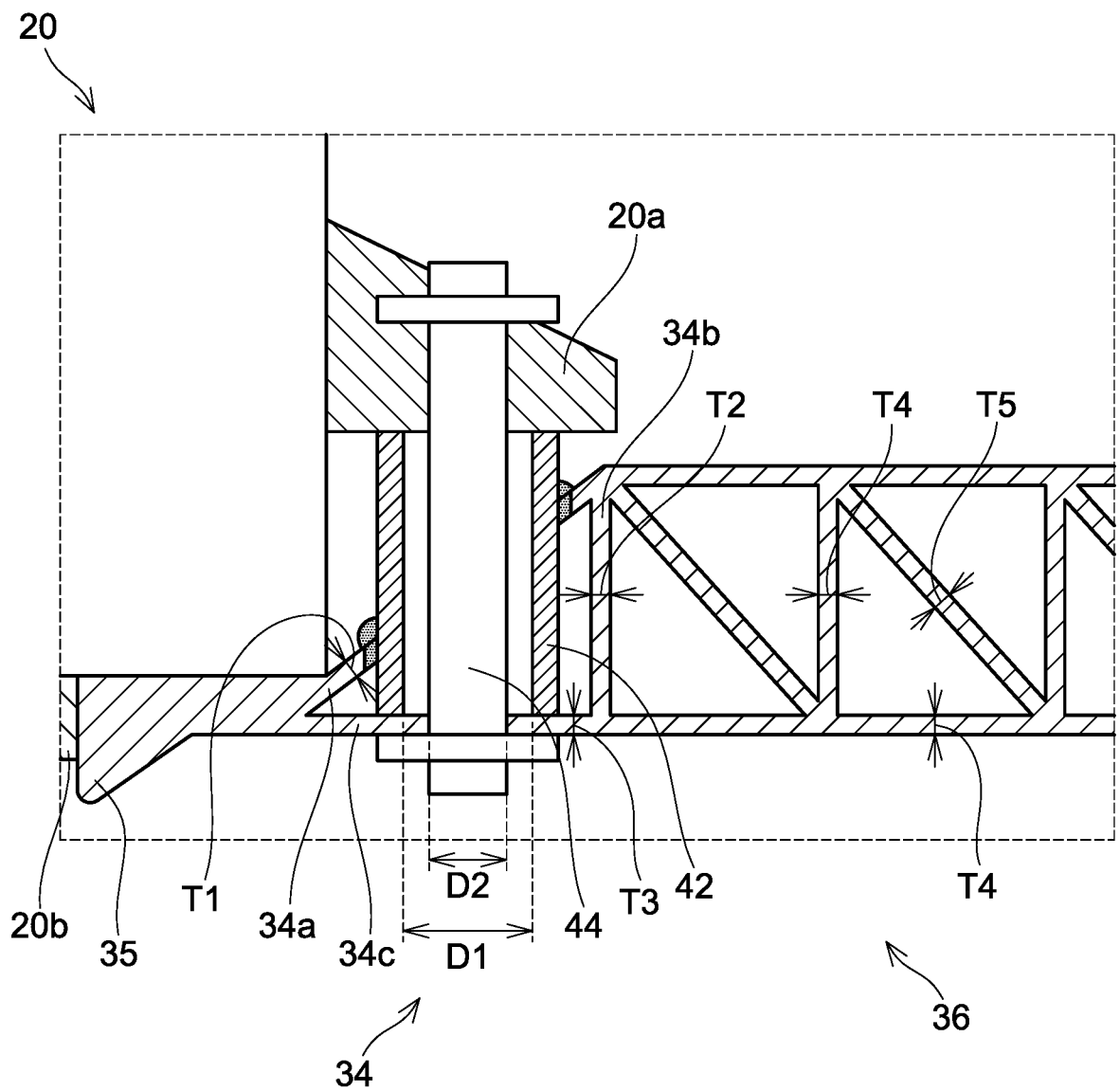
FIG. 5 is an enlarged view of an enclosed area V in FIG. 3.

Although not particularly limited to this configuration, as illustrated in FIG. 5, a thickness T1 of the inner sidewall 34a is greater than each of thicknesses T4, T5 of walls constituting the first middle portion 36. According to such a configuration, it is possible to make rigidity of the inner sidewall 34a of each of the EA members 30, 32 facing the battery pack 20 greater than rigidity of any one of the walls constituting the first middle portion 36 of each of the EA members 30, 32. Consequently, when one of the EA members 30, 32 is compressed and deformed in the vehicle width direction toward the battery pack 20, it is possible to make the corresponding inner sidewall 34a of the one of the EA members 30, 32 less susceptible to deformation as compared to any one of the walls constituting the first middle portion 36 of the one of the EA members 30, 32. Thus, it is possible to avoid or suppress the one of the EA members 30, 32 coming into contact with the corresponding sidewall of the battery pack 20.

Although not particularly limited to this configuration, as illustrated in FIG. 5, in addition to the thickness T1 of the inner sidewall 34a, a thickness T2 of the vertical wall 34b and a thickness T3 of the lower wall 34c is each greater than each of the thicknesses T4, T5 of the walls constituting the first middle portion 36. In other words, each of all the thicknesses T1 to T3 of the walls 34a to 34c constituting the inner end portion 34 is greater than each of the thicknesses T4, T5 of the walls constituting the first middle portion 36. According to such a configuration, it is possible to make rigidity of each of the walls 34a to 34c of the inner end portion 34 including the inner sidewall 34a facing the battery pack 20 greater than rigidity of any one of the walls constituting the first middle portion 36. Consequently, when one of the EA members 30, 32 is compressed and deformed in the vehicle width direction toward the battery pack 20, it is possible to make the corresponding inner end portion 34 of the one of the EA members 30, 32 less susceptible to deformation than the corresponding middle portion 36.

In another embodiment, however, the thickness T2 of the vertical wall 34b and the thickness T3 of the lower wall 34c may each be equal to the thickness T4 (and/or T5) of each wall constituting the first middle portion 36 and only the thickness T1 of the inner sidewall 34a may be greater than the thickness T4 (and/or T5) of each wall constituting the first middle portion 36. Alternatively, in yet another embodiment, the thickness T1 of the inner sidewall 34a, the thickness T2 of the vertical wall 34b and the thickness T3 of the lower wall 34c may each be equal to the thickness T4 (and/or T5) of each wall constituting the first middle portion 36.

(Embodiment 2) Next, with reference to FIG. 6, a vehicle of Embodiment 2 will be described. As compared to the vehicle 10 of Embodiment 1, the upper wall 36a of the first middle portion 36 (more specifically, the upper surface of the upper wall 36a) of each of the EA members 30, 32 of the vehicle of the present embodiment inclines downwardly as it extends outwardly in the vehicle width direction instead of the upper wall 36a of the first middle portion 36 of each of the EA members 30, 32 being at an equal height even as it extends outwardly in the vehicle width direction. The inner end portion 34 of each of the EA members 30, 32 is attached to the lower surfaces 20c of the corresponding brackets 20a of the battery pack 20 from below. The upper wall 36a of the first middle portion 36 of each of the EA members 30, 32 is located lower than the lower surfaces 20c of the corresponding brackets 20a in the vehicle height direction. According to such a configuration, when one of the EA members 30, 32 is compressed and deformed in the vehicle width direction toward the battery pack 20, it is possible to avoid or suppress the one of the EA members 30, 32 coming into contact with the sidewalls of the corresponding brackets 20a of the battery pack 20. Consequently, collision load applied from the one of the EA members 30, 32 on the battery pack 20 can be reduced. It should be noted that explanations overlapping between Embodiment 1 and the present embodiment are omitted by giving the same reference numbers to the common configurations.

The configuration of the present embodiment can also be employed in Embodiment 1. In other words, even when the upper wall 36a of the first middle portion 36 of each of the EA members 30, 32 is at the same height even as it extends outwardly in the vehicle width direction, the inner end portion 34 of each of the EA members 30, 32 is attached to the lower surfaces 20c of the corresponding brackets 20a of the battery pack 20 from below and it is possible to position the upper wall 36a of the first middle portion 36 of each of the EA members 30, 32 lower than the lower surfaces 20c of the corresponding brackets 20a in the vehicle height direction. According to such a configuration as well, when one of the EA members 30, 32 is compressed and deformed, collision load applied from the one of the EA members 30, 32 on the corresponding sidewall of the battery pack 20 can be reduced.

What is claimed is:

1. A vehicle comprising:
a vehicle body comprising a floor panel;
a battery pack located below the floor panel; and
an energy absorption member located outwardly from the battery pack in a vehicle width direction and fixing the battery pack to the vehicle body,
wherein
the energy absorption member is a hollow member extending along a vehicle longitudinal direction and having a constant cross section along the vehicle longitudinal direction, and comprises an inner sidewall that faces the battery pack,
the inner sidewall of the energy absorption member inclines downwardly in a vehicle height direction as it extends inwardly in the vehicle width direction,
the battery pack comprises a bracket that protrudes outwardly in the vehicle width direction,
the energy absorption member comprises an inner end portion in which the inner side wall is included and a middle portion adjacent to the inner end portion in the vehicle width direction,
the inner end portion of the energy absorption member is fixed to a lower surface of the bracket of the battery pack from below, and
an upper wall of the energy absorption member is located lower than the lower surface of the bracket in the vehicle height direction.

2. The vehicle according to claim 1, further comprising:
a collar extending in the vehicle height direction and comprising an upper end being in contact with the battery pack and a lower end being in contact with the energy absorption member; and
a bolt extending through the collar and fastening the energy absorption member to the battery pack.

3. The vehicle according to claim 2, wherein
the inner sidewall of the energy absorption member comprises an opening through which the collar extends.

4. The vehicle according to claim 2, wherein the collar is welded to the inner sidewall of the energy absorption member.

5. The vehicle according to claim 2, wherein an inner diameter of the collar is at least twice a nominal diameter of the bolt.

6. The vehicle according to claim 2, wherein
the bolt fastens the energy absorption member to the bracket of the battery pack.

7. The vehicle according to claim 1, wherein
a thickness of the inner side wall of the energy absorption member is greater than a thickness of any one of a plurality of walls that form the middle portion of the energy absorption member.

8. The vehicle according to claim 7, wherein a thickness of any one of a plurality of walls that form the inner end portion is greater than the thickness of any one of a plurality of walls that form the middle portion of the energy absorption member.

* * * * *